United States Patent [19]

Nakajima et al.

[11] Patent Number: 4,889,474
[45] Date of Patent: Dec. 26, 1989

[54] AIR CONDITIONING SYSTEM WITH VARIABLE CAPACITY COMPRESSOR

[75] Inventors: Nobuyuki Nakajima; Kenichi Inomata; Masaya Moruta; Toshio Yamaguchi; Kazuo Eitai, all of Konan, Japan

[73] Assignee: Diesel Kiki Co., Ltd., Tokyo, Japan

[21] Appl. No.: 263,826

[22] Filed: Oct. 28, 1988

[30] Foreign Application Priority Data

Feb. 5, 1988 [JP] Japan .............................. 63-15045[U]

[51] Int. Cl.$^4$ .............................................. F04B 49/08
[52] U.S. Cl. ..................................... 417/295; 417/310
[58] Field of Search ................................. 417/245, 310

[56] References Cited

U.S. PATENT DOCUMENTS

| | | | |
|---|---|---|---|
| 4,557,670 | 12/1985 | Inagaki et al. | 417/299 |
| 4,778,352 | 10/1988 | Nakajima | 417/295 |
| 4,818,189 | 4/1989 | Nakajima | 417/295 |

Primary Examiner—Donald E. Stout
Assistant Examiner—Robert N. Blackmon
Attorney, Agent, or Firm—Frishauf, Holtz, Goodman & Woodward

[57] ABSTRACT

An air conditioning system includes an evaporator and a variable capacity compressor. The compressor has a lower pressure zone including a suction chamber connected to the outlet of the evaporator, a higher pressure zone, a bellows displaceable in response to pressure representative of a thermal load on the system, a control valve device responsive to displacement of the bellows for bringing the higher pressure zone into and out of communication with the lower pressure zone to thereby control the difference between pressure from the higher pressure zone and pressure from the lower pressure zone, and a control element responsive to change in the difference between pressure from the higher pressure zone and pressure from the lower pressure zone for varying the delivery quantity of the compressor. The system also includes a gastight chamber formed in the compressor and accommodating the bellows, and a pressure introducing line connecting between the gastight chamber and the outlet of the evaporator and introducing pressure at the latter into the former as the pressure representative of the thermal load.

13 Claims, 6 Drawing Sheets

AIR CONDITIONING SYSTEM WITH VARIABLE CAPACITY COMPRESSOR

BACKGROUND OF THE INVENTION

This invention relates to an air conditioning system for automotive vehicles, and more particularly to a system of this kind which is provided with a variable capacity compressor in which the delivery quantity or capacity is varied by utilizing the difference between pressure in a high pressure zone and pressure in a low pressure zone, in response to a thermal load on the system, etc.

Air conditioning systems are known, which have a variable capacity compressor constituting a refrigerating circuit together with an evaporator, etc., wherein the delivery quantity or capacity of the compressor is varied by bringing a high pressure zone into and out of communication with a low pressure zone, by means of a control valve having a bellows expansible and contractible in response to suction pressure of the compressor.

Figure 1:
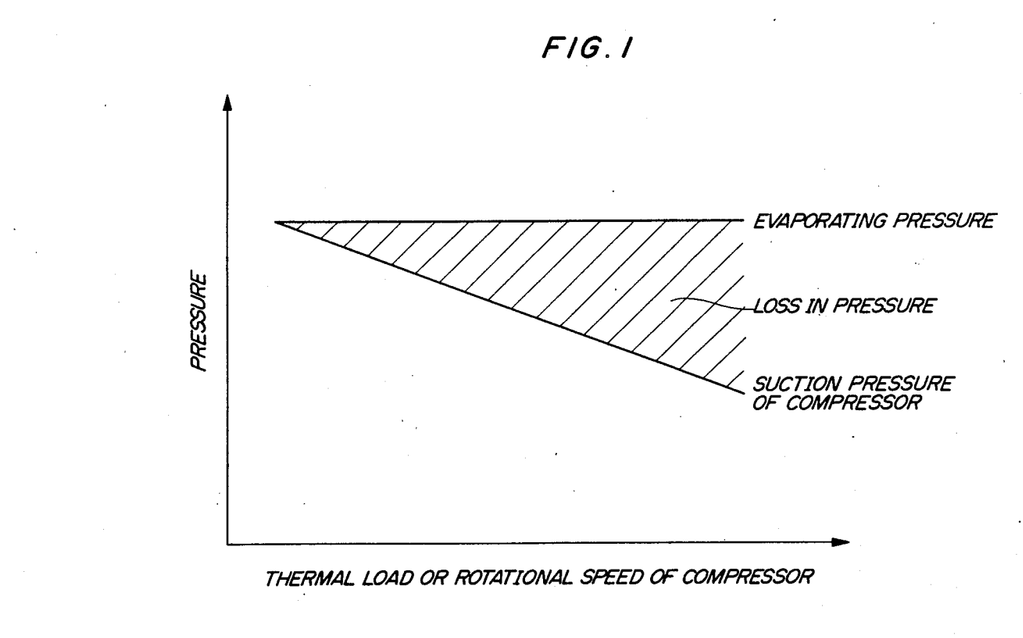
FIG. 1 is a graph showing the relationship between the evaporating pressure of an evaporator, the suction pressure, and the thermal load or the rotational speed of the compressor in a conventional air conditioning system.

The conventional basic concept of the above method of controlling the delivery quantity of the compressor by utilizing suction pressure which is representative of a thermal load on the air conditioning system and the rotational speed of the compressor, that is, a so-called internally controlling method, is as follows:

An air conditioning system in general is required to satisfy the requirements that the range of discharge air temperature that can be controlled should be limited to such a range within which the evaporator will not freeze, and the discharge air temperature should be maintained at a constant level set within the above range during operation of the system. To fulfill the latter requirement, the evaporating pressure of the evaporator should be maintained at a constant level corresponding to the set level of the discharge air temperature. In the aforesaid known air conditioning systems, suction pressure in the compressor is directly introduced into a chamber formed therein and accommodating the bellows, and the delivery quantity is controlled by contraction and expansion of the bellows in response to the suction pressure so as to maintain the suction pressure constant and thereby maintain the evaporating pressure at the constant level. However, in actuality, if the evaporating pressure is kept constant, the suction pressure is varied along the line shown in FIG. 1, which is caused by a loss in pressure within a hose (low pressure hose) connecting between the suction port of the compressor and the outlet of the evaporator due to flow resistance of the hose arranged therebetween. The pressure loss can vary in dependence upon the diameter, length, bending manner of the hose, etc. This makes it difficult to control the evaporating pressure and hence the discharge air temperature at a constant level by means of the suction pressure, which will cause freeze-up of the evaporator or increase in the discharge air temperature, resulting in poor cooling performance of the system.

Further, there are variations in the loss in pressure between different types of vehicles. For example, an F. F (front engine and front drive) type vehicle has a relatively long low pressure hose which causes a great loss in the pressure, while an F. R (front engine and rear drive) vehicle has a relatively short low pressure hose which causes a small loss in the pressure. Thus, it is required to match the characteristics of the compressor with various types of vehicles. Especially, since a vehicle under developement has its design often changed, matching operation is needed every time the design is changed, which causes an increase in the manufacturing cost.

SUMMARY OF THE INVENTION

It is a primary object of the invention to provide an air conditioning system with a variable capacity compressor, which is capable of maintaining the discharge air temperature at a constant set level to thereby enhance the comfortableness and prevent freeze-up of the evaporator and poor cooling, and at the same time is capable of reducing labor and time required for adjusting the system to various types of vehicles, thereby achieving a reduction in the manufacturing cost.

It is another object of the invention to provide an air conditioning system with a variable capacity compressor, in which the compressor has a prolonged life.

According to the present invention, there is provided an air conditioning system including an evaporator having an outlet a variable capacity compressor, the compressor having a higher pressure zone, a lower pressure zone including a suction chamber connected to the outlet of the evaporator, pressure-response means being displaceable in response to pressure representative of a thermal load on the system, pressure control means responsive to displacement of the pressure-responsive means for bringing the higher pressure zone into and out of communication with the lower pressure zone to thereby control the difference between pressure from the higher pressure zone and pressure from the lower pressure zone, and means responsive to change in the difference between pressure from the higher pressure zone and pressure from the lower pressure zone for varying the delivery quantity of the compressor.

The air conditioning system of the invention is characterized by the improvement comprising; a gastight chamber formed within the compressor and accommodating the pressure-responsive means; line means connected between the gastight chamber and the outlet of the evaporator for introducing pressure at the outlet of the evaporator as the pressure representative of a thermal load on the system into the gastight chamber; wherein the pressure control means brings the higher pressure zone into and out of communication with the lower pressure zone in response to displacement of the pressure-responsive means responsive to change in the pressure at the outlet of the evaporator.

The above and other objects, features and advantages of the invention will become more apparent upon reading of the following detailed description taken in conjunction with the accompanying drawings.

DETAILED DESCRIPTION

The invention will now be described in detail with reference to the drawings showing an embodiment thereof.

Figure 2:
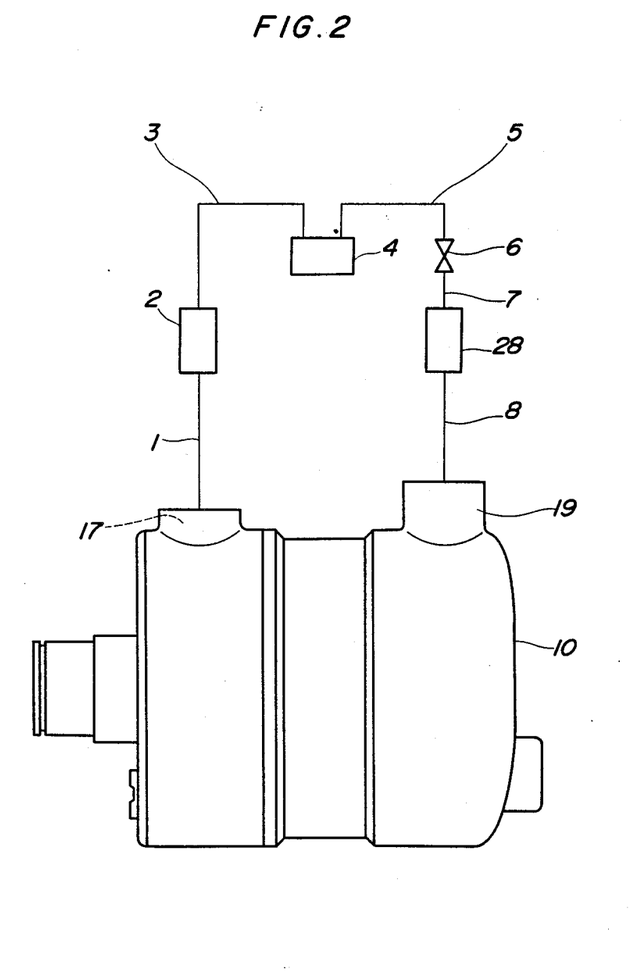
FIG. 2 is a block diagram of the entire arrangement of an air conditioning system according to an embodiment of the invention.

Referring first to FIG. 2, there is shown the entire arrangement of an air conditioning system according to the invention, wherein reference numeral 10 designates a variable capacity vane compressor which has its delivery quantity varied by means of the difference between pressure in a higher pressure zone or discharge pressure and pressure in a lower pressure zone or suction pressure, similarly to a conventional compressor. The compressor 10 has a discharge port 17 formed therein for discharging a compressed refrigerant gas as a thermal medium. The discharge port 17 has a piping connector 17a for connecting the compressor to a high pressure line 1. A refrigerating circuit is formed such that the piping connector 17a is connected to the inlet of a condenser 2 via the line 1, the outlet of the condenser 2 to the inlet of a receiver tank 4 via a line 3, the outlet of the receiver tank 4 to the inlet of an expansion valve 6 via a line 5, the outlet of the expansion valve 6 to the inlet of an evaporator 28 via a line 7, and the outlet of the evaporator 28 to a suction port 19 of the compressor 10 via a line 8, respectively.

Figure 3:
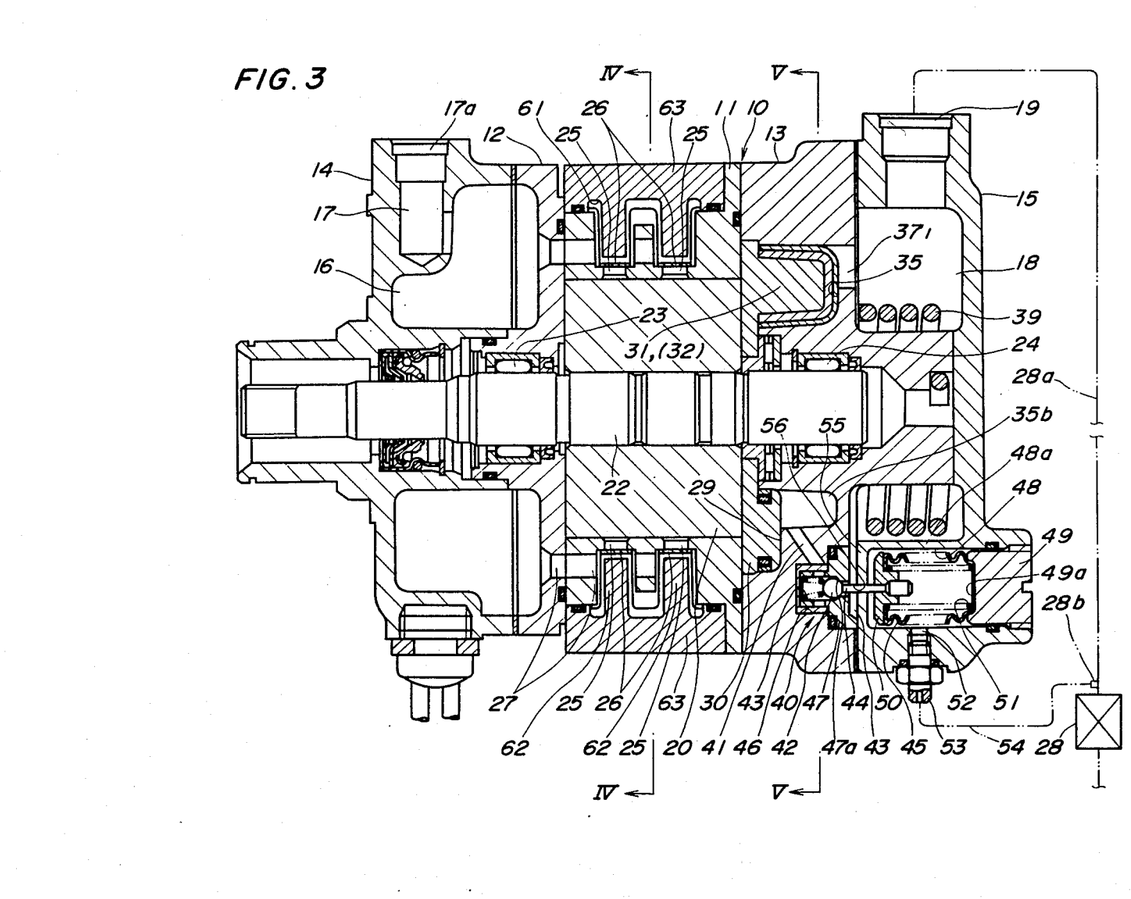
FIG. 3 is a longitudinal cross-sectional view of an example of a variable capacity vane compressor for use in the air conditioning system of FIG. 2.

FIG. 3 shows the interior of the compressor 10. The compressor 10 has a pump body composed mainly of a cylinder formed by a cam ring 11, and a front side block 12 and a rear side block 13 closing open opposite ends of the cam ring 11, a cylindrical rotor 20 rotatably received within the cylinder, and a driving shaft 22 connected to an engine, not shown, of a vehicle or the like, and on which is secured the rotor 20.

A front head 14 and a rear head 15 are provided at opposite sides of the front and rear side blocks 12 and 13, respectively. The discharge port 17 is formed in an upper portion of the front head 14. The suction port 19 is formed in an upper portion of the rear head 15, through which the refrigerant gas is to be drawn into the compressor. The discharge port 17 and the suction port 19 communicate, respectively, with a discharge pressure chamber 16 and a suction chamber 18, both formed within the compressor, as hereinafter referred to. The discharge port 17 and the discharge pressure chamber 16 form the higher pressure zone, and the suction port 19 and the suction chamber 18 form the lower pressure zone.

The driving shaft 22 is rotatably supported by a pair of radial bearings 23 and 24 provided in the side blocks 12 and 13.

Figure 4:
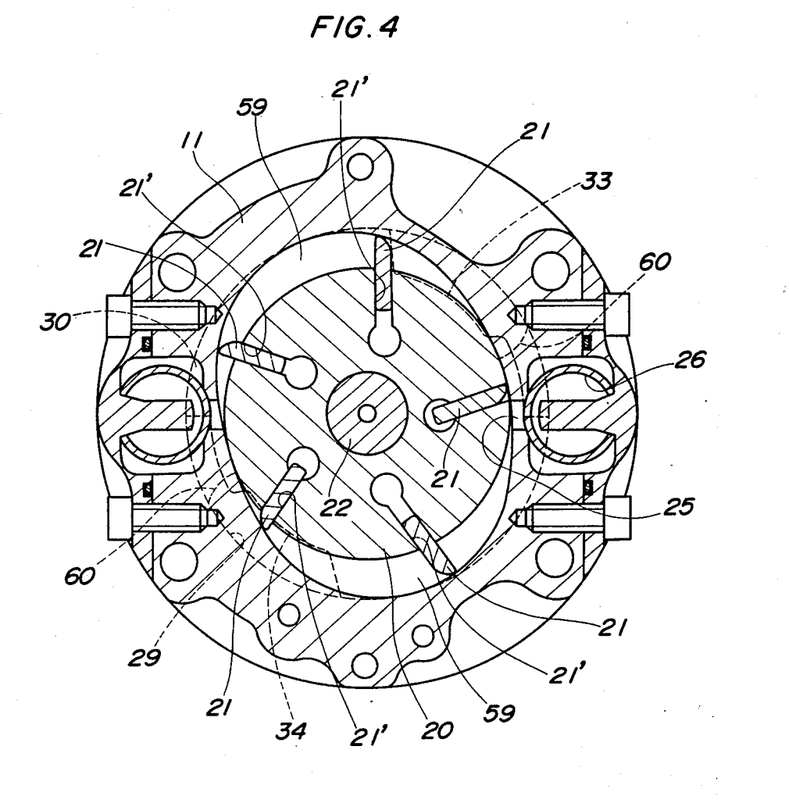
FIG. 4 is a transverse cross-sectional view taken along line IV—IV in FIG. 3.

The cam ring 11 has an inner peripheral surface with an oblong, e.g. elliptical cross section, as shown in FIG. 4, and cooperates with the rotor 20 to define therebetween a pair of spaces 59, 59 at diametrically opposite locations.

The rotor 20 has its outer peripheral surface formed with a plurality of (five in the illustrated embodiment) axial vane slits 21' at circumferentially equal intervals, in each of which a vane 21 is radially slidably fitted. Adjacent vanes 21 define therebetween five compression chambers within the spaces 59 in cooperation with the cam ring 11, the rotor 20, and opposed inner end faces of the front and rear side blocks 12, 13. The axial vane slits 21' open in opposite end faces of the rotor 20.

The cam ring 11 has a pair of outlet ports 25, 25 formed through an inner peripheral wall thereof at diametrically opposite smallest-diameter portions thereof. A pair of inlet ports 60, 60 are formed in the inner end face of the rear side block 13 opposed to the cam ring 11 at diametrically opposite locations, each aligned with a portion of the cam ring 11 between the smallest-diameter portion and the largest-diameter portion thereof. The suction chamber (low pressure chamber) 18 is defined between the rear side block 13 and the rear head 15, which is communicated with the compression chambers on the suction stroke, through the inlet ports 60, 60. The compression chambers on the compression stroke are communicated with the discharge pressure chamber (high pressure chamber) 16, through the outlet ports 25, 25, a recess 61, and a communication port 27. The outlet ports 25, 25 are each provided with a discharge valve 26 and a stopper 62 for the discharge valve 26, as shown in FIG. 3. The stoppers 62 are formed integrally with a cover 63 fitted in the recess 61 formed in the cam ring 11 and having circumferential arcuate grooves. The recess 61 is communicated with the discharge pressure chamber 16 through the communication port 27.

Figure 5:
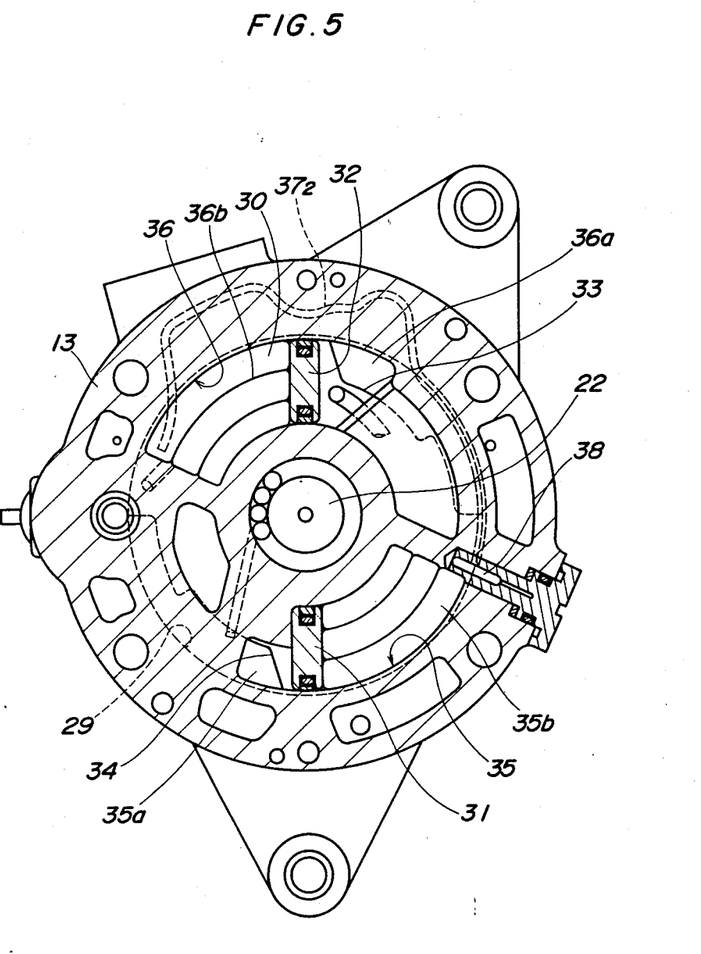
FIG. 5 is a transverse cross-sectional view taken along line V—V in FIG. 3.

The rear side block 13 has an end face facing the rotor 20, in which is formed an annular recess 29, as shown in FIG. 3. An annular control plate (radial piston) 30 as a control element is received in the annular recess 29 for rotation about the drive shaft 22 in opposite circumferential directions. As shown in FIG. 5, the control plate 30 has its outer peripheral edge formed with a pair of diametrically opposite arcuate cut-out portions 33, 34, and has its one end face remote from the rotor 20 integrally formed with a pair of diametrically opposite protuberances 31 and 32 which are slidably fitted in respective arcuate recesses 35 and 36 formed in a bottom surface of the annular recess 29 at diametrically opposite locations and each having a predetermined circumferential length.

The respective arcuate recesses 35 and 36 are divided into low pressure chambers 35a and 36a and high pressure chambers 35b and 36b by the respective protuberances 31 and 32. The low pressure chambers 35a and 36a of the recesses 35 and 36 are communicated with each other by means of a first communication passage, not shown, and the low pressure chamber 36a of the recess 36 is communicated with the suction chamber 18 via a second communication passage $37_1$. The high pressure chambers 35b and 36b of the recesses 35 and 36 are communicated with each other via a third communication passage $37_2$. The high pressure chamber 35b of the recess 35 is communicated with the discharge pressure chamber 16 via an orifice or restriction passage 38.

The control plate 30 is circumferentially urged by a spring 39 in a counterclockwise direction as viewed in FIG. 5.

Suction pressure Ps within the suction chamber 18 is introduced into the pressure chambers 35a and 36a through the second communication passage $37_1$, while discharge pressure Pd within the discharge pressure chamber 16 is introduced into the high pressure chambers 35b and 36b through the orifice 38 and the third communication passage $37_2$ to thereby create control pressure Pc within the high pressure chambers 35b and 36b.

With the above construction, the control plate 30 is circumferentially displaced in response to the difference between the sum of the suction pressure Ps within the low pressure chambers 35a and 36a and the urging force of the spring 39 and the control pressure Pc within the high pressure chambers 35b and 36b, thereby controlling the delivery quantity or capacity of the compressor. More specifically, when the sum of the suction pressure Ps within the low pressure chambers 35a and 36a and the force of the spring 39 is smaller than the control pressure Pc within the high pressure chambers 35b and 36b, the control plate 30 is displaced in a clockwise direction as viewed in FIG. 5 to thereby increase the delivery quantity of the compressor. On the other hand, when the sum of the suction pressure Ps within the low pressure chambers 35a and 36a and the force of the spring 39 becomes larger than the control pressure Pc within the high pressure chambers 35b and 36b, the control plate 30 is displaced in the counterclockwise direction as viewed in FIG. 5 to thereby decrease the delivery quantity of the compressor.

As shown in FIG. 3, the high pressure chamber 36b of the recess 36 is communicated with the suction chamber 18 via a fourth communication passage 41 formed in the rear side block 13 and in which a control valve 40 is arranged. The control valve 40 comprises a valve chamber 46 formed by a swelled portion of the fourth communication passage 41, a valve casing 47 fitted within the valve chamber 46, a valve body 42 formed by a ball, a valve spring 43 arranged within a valve casing 47, a bellows 45, and a rod 44 secured to the bellows 45 and urging the valve body 42.

The valve casing 47 has an inner end face conically shaped as a valve seat 47a, with which the valve body 42 is brought into and out of contact. The valve body 42 is urged by the valve spring 43 against the valve seat 47a, i.e. in the valve closing direction.

The rod 44 moves to the left, as viewed in FIG. 3, against the force of the spring 43 to open the valve body 42 when the bellows 45 expands, thereby communicating the suction chamber 18 with the communication passage 41.

The bellows 45 is accommodated within a bellows chamber 48 formed in the rear head 15. The bellows chamber 48 is completely isolated from the suction chamber 18 by a partition wall 48a so that pressure within the bellows chamber 48 is not affected by the suction pressure Ps within the suction chamber 18. The bellows chamber 48 is supplied only with pressure from the outlet of the evaporator 28 through a pressure inlet port 52, as hereinafter described. The bellows 45 has an end fixedly fitted in a fitting recess 49a formed in an inner end face of an adjusting screw 49. The other end of the bellows 45, which is movable, is secured to a flange or support member 50 which supports an end of the rod 44 remote from the valve body 42, rigidly fitted therethrough. The rod 44 extends in a gastight manner through a through bore 56 formed in an end wall 48 of the bellows chamber 48 facing the valve chamber 46. A coiled spring 51 is arranged within the bellows 45 in a fashion interposed between the adjusting screw 49 and the flange 50. The setting load of the coiled spring 51 is adjustable by rotating the adjusting screw 49. The adjusting screw 49 is threadedly fitted in a gastight manner in an open end of the bellows chamber 48. The rear head 15 is formed therein with the pressure inlet port 52 opening into the bellows chamber 48. Fitted in the pressure inlet port 52 is a connecting plug 53 which is connected to an end of a pressure introducing line 54 formed of a capillary tube. Preferably, the capillary tube has an inside diameter of approx. 1.5 mm, and an outside diameter of approx. 2 mm. The other end of the pressure extracting tube 28b connected at right angles to an outlet line or low pressure hose 28a or the like of the evaporator 28. With the above construction, pressure from the outlet of the evaporator 28 is introduced in the form of static pressure into the bellows chamber 48 via the pressure introducing line 54 and the pressure inlet port 52. As stated before, the bellows chamber 48 is completely isolated or separated from the suction chamber 18, and the rod 44 gastightly extends through the through bore 56 in the end wall 55 of the valve chamber 46. Thus, pressure within the bellows chamber 48 corresponds only to the pressure introduced from the outlet of the evaporator 28 through the line 54. Instead of adjusting the diameters of the rod 44 and the through bore 56 for preventing leakage of pressure from the bellows chamber 48, an O-ring may be employed to seal between the interior of the bellows chamber 48 and the valve chamber 46.

Since the bellows chamber 48 is supplied directly with pressure from the outlet of the evaporator 28, preferably through the capillary tube 54, that is, since the bellows chamber 48 is not communicated with the suction chamber 18 in which prevails suction pressure which is subject to variation due to the flow resistance of the low pressure hose connecting between the suction chamber and the outlet of the evaporator as well as due to the pumping action of the compressor (i.e. suction force), the control valve 40 can properly operate so that the discharge air temperature can be stably controlled to a set constant level.

Figure 6:
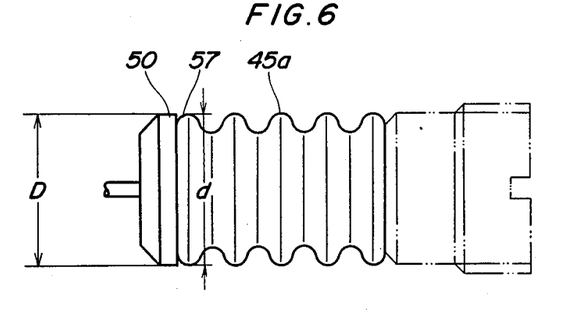
FIG. 6 is a side view of a bellows used in the compressor of FIG. 3.
Figure 7:
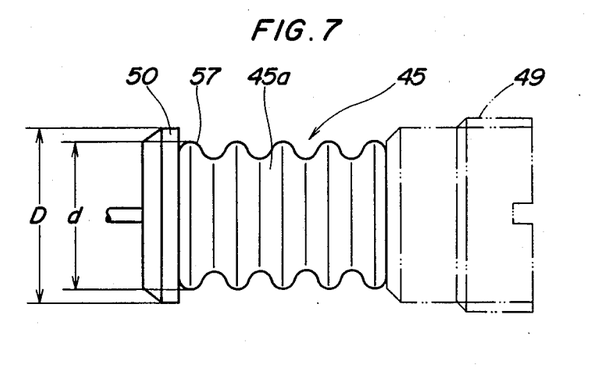
FIG. 7 is a variation of the bellows of FIG. 6.
Figure 8:
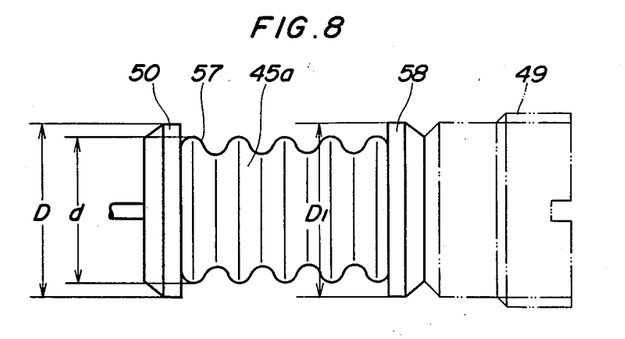
FIG. 8 is another variation of the bellows of FIG. 6.

FIGS. 6–8 show variations of the bellows 45. According to the variation of FIG. 6, the flange 50 attached to the bellows 45 at the movable end has an outer diameter D equal to the diameter d of enlarged portions 57 of a main body 45a of the bellows 45. On the other hand, according to the variation of FIG. 7, the outer diameter D of the flange 50 is larger than the diameter d of the enlarged portions 57 of the bellows 45, so that the enlarged portions 57 are kept out of contact with an inner peripheral surface of the bellows chamber 48 during the action of expansion and contraction of the bellows 45 as well as when the bellows vibrates. According to the variation of FIG. 8, a second flange 58 other than the flange 50 attached to the movable end of the bellows 45 is secured to the other end of the bellows 45. In this variation, the outer diameter D of the first flange 50, the outer diameter $D_1$ of the second flange 58, and the outer diameter d of the enlarged portions 57 of the bellows 45 are set at values fulfilling an expression $D_1 \geq D > d$. Also with this design, the enlarged portions 57 of the bellows 45 can be kept out of contact with the inner peripheral surface of the bellows chamber 48.

The operation of the air conditioning system constructed as above will now be described.

With the operation of the variable capacity compressor 10, refrigerant gas introduced through the suction port 19 into the compressor 10 is compressed to a high pressure, and the compressed gas is then circulated through the refrigerating circuit in the following order: the discharge port 17→ the line 1 → the condenser 2 → the line 3 → the receiver tank 4 → the line 5 → the expansion valve 6 → the line 7 → the evaporater 28 → the line 8 → the suction port 19.

During the operation of the system described as above, the compressor operates to vary the delivery quantity thereof in the following manner:

When the pressure at the outlet of the evaporator 28 increases, the increased pressure is transmitted to the bellows chamber 48 through the capillary tube 54 and hence the bellows 45 contracts to move the rod 44 to the right as viewed in FIG. 3, so that the valve body 42 is brought into contact with the valve seat 47 by the force of the valve spring 43 to close the control valve 40. Consequently, the control pressure Pc within the high pressure chambers 35b and 36b is not introduced into the suction chamber 18, whereby the control pressure Pc increases. With the increase in the control pressure Pc the control plate 30 is circumferentially displaced in the clockwise direction, as viewed in FIGS. 4 and 5, against the sum of the suction pressure Ps and the force of the spring 39. With the rotation of the control plate 30 in the clockwise direction, compression commencing timing of the refrigerant gas drawn into the compression chamber 59 through the inlet port 60 is advanced, whereby the delivery quantity becomes the maximum.

When the pressure at the outlet of the evaporator 28 decreases with increase in the delivery quantity, the bellows 45 expands to move the rod 44 to the left as viewed in FIG. 3, so that the valve body 42 is brought out of contact with the valve seat 47, that is, the control valve 40 is opened. Consequently, the control pressure Pc within the high pressure chambers 35b and 36b leaks into the suction chamber 18 to decrease, whereby the sum of the suction pressure Ps and the force of the spring 39 overcomes the control pressure Pc, thereby rotating the control plate 30 in the counterclockwise direction as viewed in FIGS. 4 and 5. With the rotation of the control plate 30 in the counterclockwise direction, the compression commencing timing of the refrigerant gas drawn into the compression chamber 59 through the inlet port 60 is retarded, whereby the delivery quantity becomes the minimum. Since the pressure at the outlet of the evaporator 28 increases with decrease in the delivery quantity, the evaporator 28 is prevented from being frozen.

In this way, the delivery quantity of the compressor 10 is controlled so as to maintain the evaporating pressure within the evaporator 28 at a constant level within a range in which the evaporator 28 is kept from being frozen.

By virtue of the construction of the invention that the pressure at the outlet of the evaporator 28 is introduced into the bellows chamber 48 in the form of static pressure via the capillary tube 54, the discharge air temperature is maintained at a constant set level without being affected by loss in pressure produced between the outlet of the evaporator 28 and the suction port 19 of the compressor 10, which is caused by the flow resistance of the low pressure hose connecting therebetween.

As described above, according to the air conditioning system of the invention, the discharge air temperature is maintained at a constant set level to thereby enhance the comfortableness without freeze-up of the evaporator and poor cooling, and at the same time the labor and time for adjusting the system to various types of vehicles can be decreased, thereby achieving a reduction in the manufacturing cost.

Further, according to the aforedescribed variations of the bellows used in the compressor of the system, the outer diameter of the flange attached at least to the movable end of the bellows is set to be larger than the outer diameter of the enlarged portions of the bellows, so that the bellows is kept out of contact with an inner peripheral surface of the bellows chamber during the action of expansion and contraction of the bellows as well as when the bellows vibrates, thereby prolonging the service life of the bellows.

What is claimed is:

1. In an air conditioning system including an evaporator having an outlet and a variable capacity compressor, said compressor having a higher pressure zone, a lower pressure zone including a suction chamber connected to said outlet of said evaporator, pressure-responsive means which is displaceable in response to pressure representative of a thermal load on the system, pressure control means responsive to displacement of said pressure-responsive means for bringing said higher pressure zone into and out of communication with said lower pressure zone to thereby control the difference between pressure from said higher pressure zone and pressure from said lower pressure zone, and means responsive to a change in the difference between pressure from said higher pressure zone and pressure from said lower pressure zone for varying the delivery quantity of said compressor, the improvement comprising:
 a gastight chamber formed within said compressor and accommodating said pressure-responsive means; and
 a capillary tube connected between said gastight chamber and said outlet of said evaporator for introducing pressure at said outlet of said evaporator as said pressure representative of a thermal load on the system into said gastight chamber;
 wherein said pressure control means brings said higher pressure zone into and out of communication with said lower pressure zone in response to displacement of said pressure-responsive means responsive to a change in the pressure at said outlet of said evaporator.

2. An air conditioning system as claimed in claim 1, wherein said pressure-responsive means comprises a bellows which is expansible and contractible in response to change in the pressure at said outlet of said evaporator.

3. An air conditioning system as claimed in claim 2, wherein said bellows comprises a main body which is expansible and contractible in response to change in the pressure at said outlet of said evaporator, said main body having enlarged portions, and a movable end, and a flange attached to said movable end, said flange having an outer diameter larger than an outer diameter of said enlarged portions of said main body.

4. An air conditioning system as claimed in claim 2, wherein said bellows comprises a main body which is expansible and contractible in response to change in the pressure at said outlet of said evaporator, said main body having enlarged portions, a movable end, and another end, a first flange attached to said movable end, and a second flange secured to said another end, said first and second flanges having respective outer diameters larger than an outer diameter of said enlarged portions of said main body, the outer diameter of said second flange being equal to or larger than the outer diameter of said first flange.

5. An air conditioning system as claimed in claim 2, wherein said compressor includes a cylinder having at least one inlet port, a rotor rotatably received within said cylinder, a plurality of vanes carried by said rotor, said cylinder, said rotor, and adjacent ones of said vanes cooperating to define at least one compression chamber, and a control element angularly movably arranged within said cylinder in slidable contact with one end face of said rotor, the angular position of said control element determining compression commencing timing of a regrigerant gas drawn into said at least one compression chamber through said at least one inlet port, said control element being angularly displaceable substantially in response to change in the difference between pressure from said higher pressure zone and pressure from said lower pressure zone.

6. An air conditioning system as claimed in claim 1, wherein said compressor includes a cylinder having at least one inlet port, a rotor rotatably received within said cylinder, a plurality of vanes carried by said rotor, said cylinder, said rotor, and adjacent ones of said vanes cooperating to define at least one compression chamber, and a control element angularly movably arranged within said cylinder in slidable contact with one end face of said rotor, the angular position of said control element determining compression commencing timing of a regrigerant gas drawn into said at least one compression chamber through said at least one inlet port, said control element being angularly displaceable substantially in response to change in the difference between pressure from said higher pressure zone and pressure from said lower pressure zone.

7. An air conditioning system as claimed in claim 6, wherein said bellows comprises a main body which is expansible and contractible in response to change in the pressure at said outlet of said evaporator, said main body having enlarged portions, and a movable end, and a flange attached to said movable end, said flange having an outer diameter larger than an outer diameter of said enlarged portions of said main body.

8. An air conditioning system as claimed in claim 6, wherein said bellows comprises a main body which is expansible and contractible in response to change in the pressure at said outlet of said evaporator, said main body having enlarged portions, a movable end, and another end, a first flange attached to said movable end, and a second flange secured to said another end, said first and second flanges having respective outer diameters larger than an outer diameter of said enlarged portions of said main body, the outer diameter of said second flange being equal to or larger than the outer diameter of said first flange.

9. An air conditioning system as claimed in claim 1, wherein said bellows comprises a main body which is expansible and contractible in response to change in the pressure at said outlet of said evaporator, said main body having enlarged portions, and a movable end, and a flange attached to said movable end, said flange having an outer diameter larger than an outer diameter of said enlarged portions of said main body.

10. An air conditioning system as claimed in claim 1, wherein said bellows comprises a main body which is expansible and contractible in response to change in the pressure at said outlet of said evaporator, said main body having enlarged portions, a movable end, and another end, a first flange attached to said movable end, and a second flange secured to said another end, said first and second flanges having respective outer diameters larger than an outer diameter of said enlarged portions of said main body, the outer diameter of said second flange being equal to or larger than the outer diameter of said first flange.

11. In an air conditioning system including an evaporator having an outlet and a variable capacity compressor, said compressor having a higher pressure zone, a lower pressure zone including a suction chamber connected to said outlet of said evaporator, pressure-responsive means which is displaceable in response to pressure representative of a thermal load on the system, pressure control means responsive to displacement of said pressure-responsive means for bringing said higher pressure zone into and out of communication with said lower pressure zone to thereby control the difference between pressure from said higher pressure zone and pressure from said lower pressure zone, and means responsive to a change in the difference between pressure from said higher pressure zone and pressure from said lower pressure zone for varying the delivery quantity of said compressor, the improvement comprising:

a gastight chamber formed within said compressor and accommodating said pressure-responsive means; and line means connected between said gastight chamber and said outlet of said evaporator for introducing pressure at said outlet of said evaporator as said pressure representative of a thermal load on the system into said gastight chamber;

said pressure-responsive means including a bellows having a main body which is expansible and contractible in response to change in the pressure at said outlet of said evaporator, said main body having enlarged portions, and a movable end, and a flange attached to said movable end, said flange having an outer diameter larger than an outer diameter of said enlarged portions of said main body; and said compressor including a cylinder having at least one inlet port, a rotor rotatably received within said cylinder, a plurality of vanes carried by said rotor, said cylinder, said rotor, and adjacent ones of said vanes cooperating to define at least one compression chamber, and a control element angularly movably arranged within said cylinder in slidable contact with one end face of said rotor, the angular position of said control element determining compression commencing timing of a refrigerant gas drawn into said at least one compression chamber through said at least one inlet port, said control element being angularly displaceable substantially in response to change in the difference between pressure from said higher pressure zone and pressure from said lower pressure zone;

wherein said pressure control means brings said higher pressure zone into and out of communication with said lower pressure zone in response to displacement of said pressure-responsive means responsive to a change in the pressure at said outlet of said evaporator.

12. An air conditioning system as claimed in claim 11, wherein said line means comprises a capillary tube.

13. An air conditioning system as claimed in claim 11, wherein said bellows includes another end having an another flange thereon, both of said flanges having diameters larger than the diameter of said enlarged portions of said main body, said another flange having an outer diameter equal to or larger than the outer diameter of the first-mentioned flange.

* * * * *